US010346205B2

(12) United States Patent
Ahn et al.

(10) Patent No.: US 10,346,205 B2
(45) Date of Patent: Jul. 9, 2019

(54) METHOD OF SHARING A MULTI-QUEUE CAPABLE RESOURCE BASED ON WEIGHT

(71) Applicant: SAMSUNG ELECTRONICS CO., LTD., Suwon-si, Gyeonggi-do (KR)

(72) Inventors: Sungyong Ahn, Seoul (KR); Kwanghyun La, Uiwang-si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 274 days.

(21) Appl. No.: 15/370,652

(22) Filed: Dec. 6, 2016

(65) Prior Publication Data

US 2017/0199765 A1    Jul. 13, 2017

(30) Foreign Application Priority Data

Jan. 11, 2016    (KR) .................. 10-2016-0003350

(51) Int. Cl.
G06F 9/46    (2006.01)
G06F 9/50    (2006.01)
G06F 9/48    (2006.01)

(52) U.S. Cl.
CPC .......... G06F 9/5005 (2013.01); G06F 9/4806 (2013.01)

(58) Field of Classification Search
CPC .................. G06F 9/5005; G06F 9/4806
See application file for complete search history.

(56) References Cited

U.S. PATENT DOCUMENTS

| 7,127,798 | B1* | 10/2006 | Reger | G06F 3/0626 29/603.03 |
| 7,646,717 | B1* | 1/2010 | Anker | H04L 47/527 370/235 |
| 7,761,375 | B2 | 7/2010 | Karamanolis et al. | |
| 7,761,875 | B2* | 7/2010 | Karamanolis | G06F 9/50 370/235 |
| 7,836,212 | B2* | 11/2010 | Tripathi | G06F 3/0613 710/2 |
| 8,302,633 | B2* | 11/2012 | Saltel | F16L 33/003 138/109 |
| 8,380,541 | B1* | 2/2013 | Holmes | G06F 15/16 705/3 |

(Continued)

FOREIGN PATENT DOCUMENTS

JP    2015518987    7/2015
KR    1020140082756    7/2014

OTHER PUBLICATIONS

Zhang, et al., "Storage Performance Virtualization via Throughput and Latency Control", ACM Transactions on Storage, vol. 2., No. 3. Aug. 2006, pp. 283-308.

(Continued)

Primary Examiner — Adam Lee
(74) Attorney, Agent, or Firm — F. Chau & Associates, LLC

(57) ABSTRACT

An input/output (I/O) throttling method of a process group, performed with respect to a multi-queue capable resource, includes setting a total credit corresponding to the multi-queue capable resource, allocating an individual credit to the process group based on the total credit and a weight of the process group, and selectively dispatching an I/O request of the process group to a multi-queue manager by consuming at least a part of the individual credit.

18 Claims, 13 Drawing Sheets

(56) References Cited

U.S. PATENT DOCUMENTS

| | | | | |
|---|---|---|---|---|
| 8,392,585 B1* | 3/2013 | Balwani | | H04L 43/0811 709/228 |
| 8,392,633 B2* | 3/2013 | Gulati | | G06F 9/5011 710/36 |
| 8,435,738 B2* | 5/2013 | Holmes | | G01N 33/50 422/68.1 |
| 8,601,473 B1* | 12/2013 | Aron | | G06F 9/45533 718/1 |
| 9,298,493 B1* | 3/2016 | Harel | | G06F 9/46 |
| 9,563,511 B1* | 2/2017 | Foley | | G06F 11/1092 |
| 9,760,392 B1* | 9/2017 | Dantkale | | G06F 9/45558 |
| 9,823,857 B1* | 11/2017 | Pendharkar | | G06F 3/0613 |
| 2003/0103514 A1* | 6/2003 | Nam | | H04L 47/39 370/412 |
| 2003/0115513 A1* | 6/2003 | Harriman | | H04L 1/0061 714/49 |
| 2003/0135449 A1* | 7/2003 | Xu | | H04L 47/623 705/38 |
| 2003/0231645 A1* | 12/2003 | Chandra | | H04L 45/00 370/412 |
| 2005/0137966 A1* | 6/2005 | Munguia | | G06Q 40/025 705/38 |
| 2005/0141424 A1* | 6/2005 | Lim | | H04L 47/24 370/235 |
| 2007/0189283 A1* | 8/2007 | Agarwal | | H04L 45/00 370/388 |
| 2007/0242675 A1* | 10/2007 | Romrell | | H04L 12/4633 370/395.4 |
| 2011/0103316 A1* | 5/2011 | Ulupinar | | H04L 47/10 370/329 |
| 2011/0149977 A1* | 6/2011 | Thomas | | H04L 47/524 370/395.41 |
| 2012/0327779 A1* | 12/2012 | Gell | | H04L 47/2475 370/238 |
| 2012/0330802 A1* | 12/2012 | Guthrie | | G06Q 50/10 705/34 |
| 2012/0331231 A1* | 12/2012 | Floyd | | G06Q 50/10 711/119 |
| 2013/0054901 A1* | 2/2013 | Biswas | | G06F 13/1642 711/154 |
| 2013/0254324 A1* | 9/2013 | Kramnik | | G06F 12/0246 709/213 |
| 2013/0258791 A1* | 10/2013 | Mishima | | G11C 7/00 365/189.15 |
| 2013/0262533 A1* | 10/2013 | Mitra | | G06F 17/30132 707/822 |
| 2013/0318283 A1* | 11/2013 | Small | | G06F 12/0246 711/103 |
| 2014/0052938 A1* | 2/2014 | Kim | | G06F 12/00 711/154 |
| 2014/0059551 A1* | 2/2014 | Umanesan | | H04L 67/1097 718/102 |
| 2014/0169488 A1* | 6/2014 | Varanese | | H04L 27/2613 375/260 |
| 2014/0204748 A1* | 7/2014 | Basso | | H04L 47/527 370/235 |
| 2014/0244899 A1* | 8/2014 | Schmier | | G06F 3/0616 711/103 |
| 2014/0280970 A1* | 9/2014 | Pijewski | | H04L 41/0896 709/226 |
| 2015/0199269 A1* | 7/2015 | Bert | | G06F 12/0246 711/103 |
| 2016/0085458 A1* | 3/2016 | Skandakumaran | | G06F 3/0613 710/313 |
| 2016/0117105 A1* | 4/2016 | Thangaraj | | G06F 3/0616 711/103 |
| 2016/0234297 A1* | 8/2016 | Ambach | | H04L 67/1008 |
| 2016/0291882 A1* | 10/2016 | Wakhare | | G06F 3/0613 |
| 2016/0292116 A1* | 10/2016 | Wakhare | | G06F 13/4027 |
| 2017/0010992 A1* | 1/2017 | Sarcone | | G06F 13/26 |

OTHER PUBLICATIONS

Axboe, Jens, "Linux Block IO-Present and Future", Proceedings of the Linux Symposium, vol. One, Jul. 21-24, 2004, Ottawa, Ontario Canada, pp. 51-61.

Min, Junghi et al., "Cgroup++: Enhancing I/O Resource Management of Linux Cgroup on NUMA Systems with NVME SSds", Middleware Posters and Demos '15, Dec. 7-11, 2015, Vancouver, BC.

Poster: Min, Junghi et al., "Cgroup++: Enhancing I/O Resource Management of Linux Cgroup on NUMA Systems with NVME SSds", Middleware Posters and Demos '15, Dec. 7-11, 2015, Vancouver, BC.

* cited by examiner

```
1   Next_TotalCredit (MaxWeightPG)
2       If (ThrottlingTime > 0)
3           ServiceRate ← ConsumedCredit / DispatchingTime
4           NextCredit ← InitialCredit + (ServiceRate * ThrottlingTime)
5       Else
6           NextCredit ← ConsumedCredit
7       End If
8       NextTotalCredit ← TotalCredit * (NextCredit / InitialCredit)
9   Return NextTotalCredit
```

```
1   Next_TotalCredit (MaxWeightPG)
2       ServiceRate ← ConsumedCredit / DispatchingTime
3       NextCredit ← ServiceRate * (DispatchingTime + ThrottlingTime)
4       NextTotalCredit ← TotalCredit * (NextCredit / InitialCredit)
5   Return NextTotalCredit
```

METHOD OF SHARING A MULTI-QUEUE CAPABLE RESOURCE BASED ON WEIGHT

CROSS-REFERENCE TO RELATED APPLICATION

This application claims priority under 35 U.S.C. § 119 to Korean Patent Application No. 10-2016-0003350, filed on Jan. 11, 2016 in the Korean Intellectual Property Office, the disclosure of which is incorporated by reference herein in its entirety.

TECHNICAL FIELD

Exemplary embodiments of the inventive concept relate to a method of sharing a multi-queue resource, and more particularly, to a method of sharing a multi-queue resource based on weight.

DISCUSSION OF RELATED ART

To access a resource such as a hardware device, an application may dispatch, to an operating system (OS), an input and output (I/O) request with respect to the resource. The OS may have a hierarchical structure and may transfer the I/O request dispatched from the application to the resource (e.g., the hardware device).

Performance of processors that can execute the OS and multiple applications (or multiple processes) and resources connected to these processors has increased over time. Accordingly, providing high bandwidth to the multiple applications may be able to take advantage of this increased performance.

SUMMARY

According to an exemplary embodiment of the inventive concept, an input/output (I/O) throttling method of a process group, performed with respect to a multi-queue capable resource, includes setting a total credit corresponding to the multi-queue capable resource, allocating an individual credit to the process group based on the total credit and a weight of the process group, and selectively dispatching an I/O request of the process group to a multi-queue manager by consuming at least a part of the individual credit.

According to an exemplary embodiment of the inventive concept, an I/O throttling method of a plurality of process groups, performed with respect to a multi-queue capable resource, includes setting a total credit corresponding to the multi-queue capable resource, allocating individual credits to the plurality of process groups based on the total credit and weights of the plurality of process groups, and selectively dispatching I/O requests of each of the plurality of process groups to a multi-queue manager by consuming at least parts of at least one of the individual credits.

According to an exemplary embodiment of the inventive concept, an I/O throttling method of a plurality of process groups, performed with respect to a multi-queue capable resource, includes determining a first total credit, with respect to the multi-queue capable resource, for the plurality of process groups. Each of the plurality of process groups is assigned a weight and a first process group among the plurality of process groups has the highest weight and is allocated a first individual credit that is a portion of the first total credit. The I/O throttling method further includes dispatching I/O requests from the first process group and consuming at least a part of the first individual credit when the first individual credit is not exhausted during a dispatching time, and delaying I/O requests from the first process group when the first individual credit is exhausted during a throttling time. The dispatching time and the throttling time form a first period.

BRIEF DESCRIPTION OF THE DRAWINGS

The above and other features of the inventive concept will be more clearly understood by describing in detail exemplary embodiments thereof with reference to the accompanying drawings.

FIGS. 8A and 8B are diagrams of examples of an operation of FIG. 6 of setting a total credit based on a credit of a process group having a highest weight, according to exemplary embodiments of the inventive concept.

DETAILED DESCRIPTION OF THE EMBODIMENTS

Figure 1:
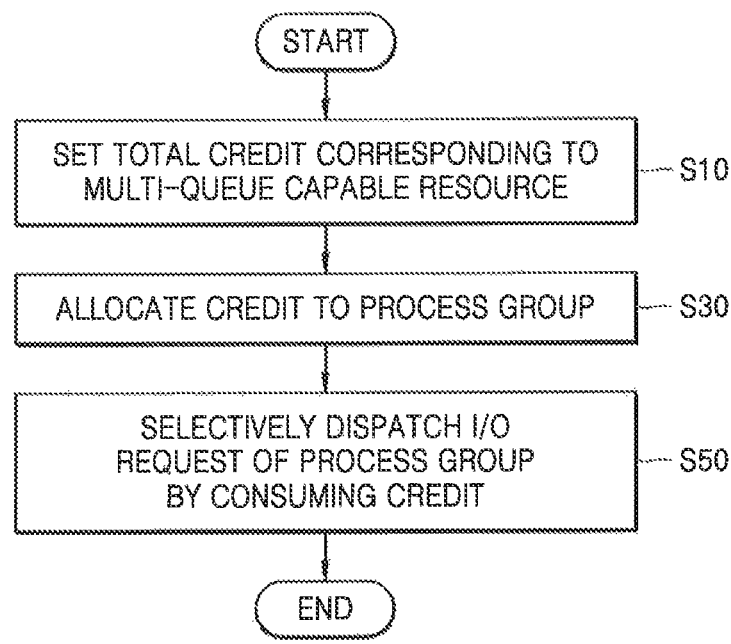
FIG. 1 is a flowchart of an input/output throttling method of a process group, according to an exemplary embodiment of the inventive concept.

Exemplary embodiments of the inventive concept will be described more fully hereinafter with reference to the accompanying drawings. Like reference numerals may refer to like elements throughout the accompanying drawings.

Exemplary embodiments of the inventive concept provide a method of sharing a multi-queue capable resource and enabling a process to use the high bandwidth provided by the multi-queue capable resource.

FIG. 1 is a flowchart of an input/output (I/O) throttling method of a process group, according to an exemplary embodiment of the inventive concept. The I/O throttling method of the process group of FIG. 1 may be performed by a processor that executes a software module including a plurality of instructions or by a hardware module including a hardware logic block. As will be described below, a multi-queue resource may be efficiently shared by using the I/O throttling method of the process group according to the present exemplary embodiment.

A process group may include at least one process executed on an operating system (OS). For example, the process group may be an application including one or more processes or a container including one or more applications. The container may virtualize an environment that may drive the application including the one or more processes. The container may virtualize a central processing unit (CPU) and a memory region to provide an independent environment for applications. Containers may share a library, the OS, etc. As will be described below with reference to FIG. 3, the process group, such as the container, may have a weight (or an I/O weight). The weight may be determined in advance based on the importance of the process group. The OS may adjust an occupancy rate with respect to resources of the process group based on the weight.

A plurality of process groups may be performed on the OS. Each process group may dispatch an I/O request for the OS to access a resource. The resource may be a hardware device accessible through a device driver of the OS and may include, for example, a storage device, an I/O device, a communication device, etc. For example, the resource may be a storage device accessible through various interface protocols, such as universal serial bus (USB), embedded MultiMediaCard (eMMC), peripheral component interconnection express (PCI-E), non-volatile memory express (NVMe), universal flash storage (UFS), Advanced Technology Attachment (ATA), Serial-ATA, Parallel-ATA, small computer system interface (SCSI), enhanced small disk interface (ESDI), or Integrated Drive Electronics (IDE). The resource is described as a storage device below, but it will be understood that the inventive concept is not limited thereto.

A computing system including a CPU (or a processor) that execute process groups and an OS may include a plurality of resources. The OS may schedule I/O requests dispatched by process groups to be transferred to the plurality of resources. For example, the OS may have a hierarchical structure including a plurality of layers and may dispatch the I/O requests of the process groups from upper layers to lower layers to process the I/O requests. As performance of processors and resources has increased, exemplary embodiments of the inventive concept provide a scheme for quickly processing abundant I/O requests of the process groups. For example, the storage device (the resource) may be connected to a bus of the computing system such as PCI-E, which provides a high I/O bandwidth.

The storage device and the OS use a multi-queue technique to provide a high I/O bandwidth. In other words, the OS may store the I/O requests of the process groups with respect to the storage device in a plurality of queues and may transfer the I/O requests stored in the plurality of queues to the storage device. The storage device may process the I/O requests received from the plurality of queues in parallel with one another and may perform an operation in response to the I/O requests, e.g., storing or reading data. As described above, a resource that supports this multi-queue technique may be referred to as a multi-queue capable resource.

The I/O throttling method of the process group according to an exemplary embodiment of the inventive concept may fully utilize the multi-queue technique to allow process groups to efficiently share the multi-queue capable resource. The process groups may share resources substantially in correspondence with the weights of the process groups.

Referring to FIG. 1, in operation S10, a total credit corresponding to a multi-queue capable resource may be set. The total credit may have a value corresponding to an I/O bandwidth provided by the multi-queue capable resource. I/O requests of process groups accessing the multi-queue capable resource may be processed within the range of the I/O bandwidth provided by the multi-queue capable resource. The total credit may be periodically set. A total credit of a current period may be determined based on an I/O throughput of the multi-queue capable resource during a previous period. A detailed description of operation S10 will be described below with reference to FIG. 6.

In operation S30, a credit (or an individual credit) may be allocated to a process group. The credit may be determined based on the total credit and the weight of the process group. The determined credit may be allocated to the process group. As will be described below with reference to FIG. 4, the credit of the process group may be determined such that the ratio of the sum of weights of the plurality of process groups to the weight of the process group is identical to the ratio of the total credit to the credit of the process group. Similar to operation S10, the credit of the process group may be periodically determined and allocated.

In operation S50, the I/O request of the process group may be selectively dispatched by consuming the credit. For example, the I/O request dispatched from the process group may be selectively dispatched to a lower layer (e.g., a block layer of FIG. 2) by consuming the credit allocated in operation S30. In other words, the credit allocated in operation S30 may be consumed by dispatching the I/O request of the process group, and when the credit is consumed and thus exhausted, subsequent I/O requests of the process group may not be dispatched to the lower layer. Operation S50 may be performed on the plurality of process groups in parallel with one another.

Figure 2:
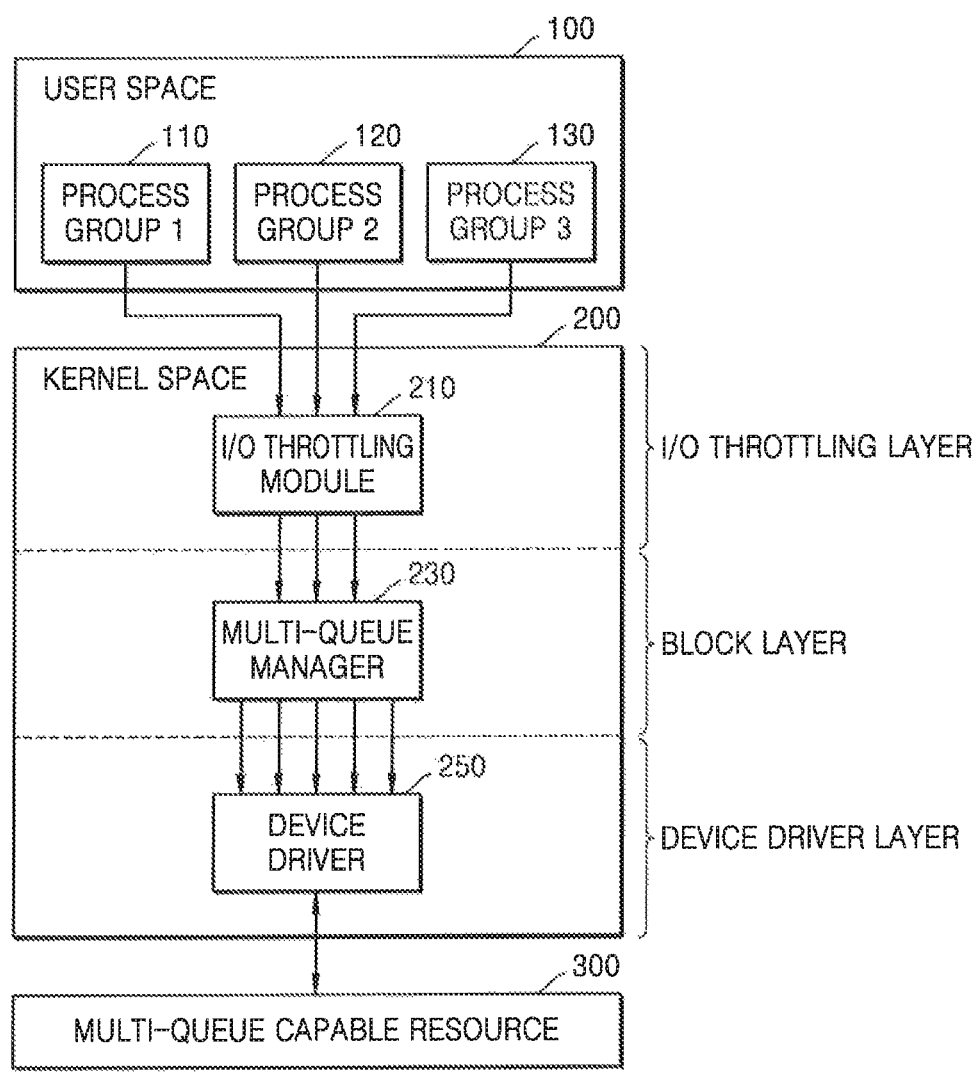
FIG. 2 is a flow block diagram of input/output requests of process groups, according to an exemplary embodiment of the inventive concept.

FIG. 2 is a flow block diagram of I/O requests of process groups 110, 120, and 130 according to an exemplary embodiment of the inventive concept. As described with reference to FIG. 1 above, the process groups 110, 120, and 130 may dispatch the I/O requests to the OS to access a resource (for example, a multi-queue capable resource 300 of FIG. 2).

As shown in FIG. 2, the OS may provide a user space 100 and a kernel space 200. The plurality of the process groups 110, 120, and 130 may be executed in the user space 100. As described with reference to FIG. 1, each of the process groups 110, 120, and 130 may include one or more processes and may be, for example, a container including one or more applications. FIG. 2 shows an example in which the three process groups 110, 120, and 130 are executed in the user space 100, but the inventive concept is not limited thereto. In other words, one or more process groups may be executed in the user space 100. For convenience of description, an exemplary embodiment of the inventive concept, in which the first through third process groups 110, 120 and 130 are executed, is described below.

The kernel space 200 may include a plurality layers, for example, an I/O throttling layer, a block layer, and a device driver layer. The layers of the kernel space 200 of FIG. 2 are merely examples. For example, the kernel space 200 may further include layers that are not shown in FIG. 2.

Referring to FIG. 2, the process groups 110, 120, and 130 may dispatch I/O requests with respect to the multi-queue capable resource 300 to an I/O throttling module 210 of the kernel space 200. The I/O throttling module 210 may be included in the I/O throttling layer between the process groups 110, 120, and 130 and the block layer. According to an exemplary embodiment of the inventive concept, in an OS providing the kernel space 200 including the block layer and the device driver layer, the I/O throttling layer including the I/O throttling module 210, as shown in FIG. 2, may be added to the OS without changing the block layer and the device layer.

According to an exemplary embodiment of the inventive concept, the I/O throttling module 210 may perform the I/O throttling method of the process group as shown in FIG. 1. The I/O throttling module 210 may dispatch I/O requests of the process groups 110, 120, and 130 to a multi-queue manager 230 in parallel with one another. Thus, the I/O throttling module 210 may efficiently use the multi-queue manager 230, and the process groups 110, 120, and 130 may efficiently share the multi-queue capable resource 300.

The multi-queue manager 230 may receive the I/O request from the I/O throttling module 210 of an upper layer (e.g., the I/O throttling layer). The multi-queue manager 230 may include and manage a plurality of queues that store I/O requests. For example, when a processor includes a plurality of cores, the multi-queue manager 230 may include a plurality of software queues corresponding to the cores and a plurality of hardware dispatch queues accessible by the multi-queue capable resource 300. As shown in FIG. 2, the multi-queue manager 230 may be included in the block layer between the I/O throttling layer and the device driver layer.

A device driver 250 may receive the I/O request from the multi-queue manager 230 of the block layer. The device driver 250 may transfer the I/O request to the multi-queue capable resource 300 through an interface protocol supported by the multi-queue capable resource 300. The device driver 250 may receive state information of the multi-queue capable resource 300, operation complete information, an interrupt, etc. from the multi-queue capable resource 300.

The multi-queue capable resource 300 may be a hardware storage device as described with reference to FIG. 1, for example, a storage device providing a high I/O bandwidth such as an NVMe solid state drive (SSD). The multi-queue capable resource 300 may provide the high I/O bandwidth by processing the I/O requests stored in the plurality of queues in parallel with one another.

Figure 3:
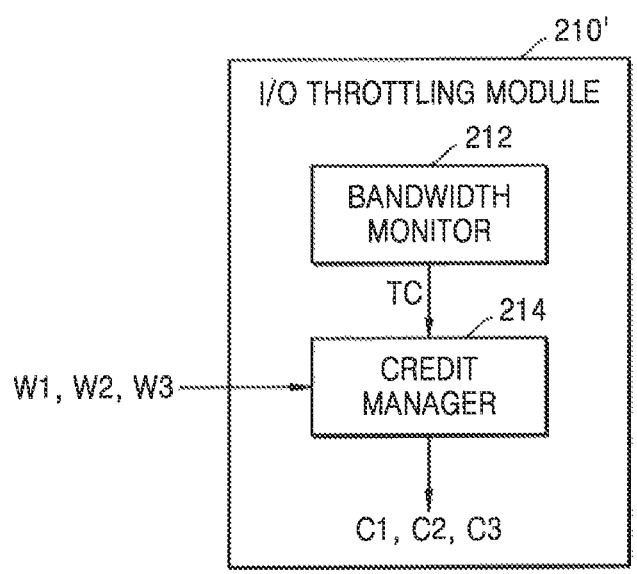
FIG. 3 is a block diagram of an input/output throttling module of FIG. 2, according to an exemplary embodiment of the inventive concept.

FIG. 3 is a block diagram of an I/O throttling module of FIG. 2 according to an exemplary embodiment of the inventive concept. As described with reference to FIG. 2, the I/O throttling module 210 may perform the I/O throttling method of process groups (of FIG. 1). As shown in FIG. 3, an I/O throttling module 210' may include a bandwidth monitor 212 and a credit manager 214. Each of the bandwidth monitor 212 and the credit manager 214 may be a software module including a plurality of instructions executed by a processor.

Referring to FIG. 3, the bandwidth monitor 212 may generate a total credit TC. As described with reference to operation S10 of FIG. 1, the total credit TC may have a value corresponding to the I/O bandwidth of the multi-queue capable resource 300 of FIG. 2. The bandwidth monitor 212 may monitor an I/O throughput with respect to a resource (e.g., the multi-queue capable resource 300) and may calculate the total credit TC according to a monitoring result during a preset period. The total credit TC may be periodically calculated by the bandwidth monitor 212, and thus, the total credit TC may be adaptively changed and an I/O operation may be throttled with respect to the resource. A detailed description of an operation of the bandwidth monitor 212 will be provided below with reference to FIGS. 8A and 8B.

The credit manager 214 may receive weights W1, W2, and W3 of the process groups (e.g., the process groups 110, 120, and 130 of FIG. 2) and the total credit TC, and may generate credits C1, C2, and C3. As described above, the process groups may have weights, and the credit manager 214 may calculate credits in proportion to the weights of the process groups and allocate the calculated credits to the process groups. For example, the credit manager 214 may receive the weights W1, W2, and W3 of first to third process groups 110, 120, and 130, respectively, of FIG. 2. With respect to the first process group 110, the credit manager 214 may determine a first credit C1 such that a ratio of a total weight (e.g., W1+W2+W3) to the first weight W1 and a ratio of the total credit TC to the first credit C1 are identical, and may allocate the first credit C1 to the first process group 110. The second and third credits C2 and C3 may be similarly determined and allocated. A detailed description of this operation of the credit manager 214 will be provided below with reference to FIG. 4.

The credit manager 214 may selectively dispatch the I/O requests dispatched by the process groups to a lower layer (for example, the block layer of FIG. 2) based on the credits allocated to the process groups. For example, the credit manager 214 may receive an I/O request from the first process group 110 of FIG. 2 and may consume the first credit C1 to selectively dispatch the I/O request to the lower layer. A detailed description of this operation of the credit manager 214 that selectively dispatches the I/O requests based on the credits will be provided below with reference to FIG. 5.

Figure 4:
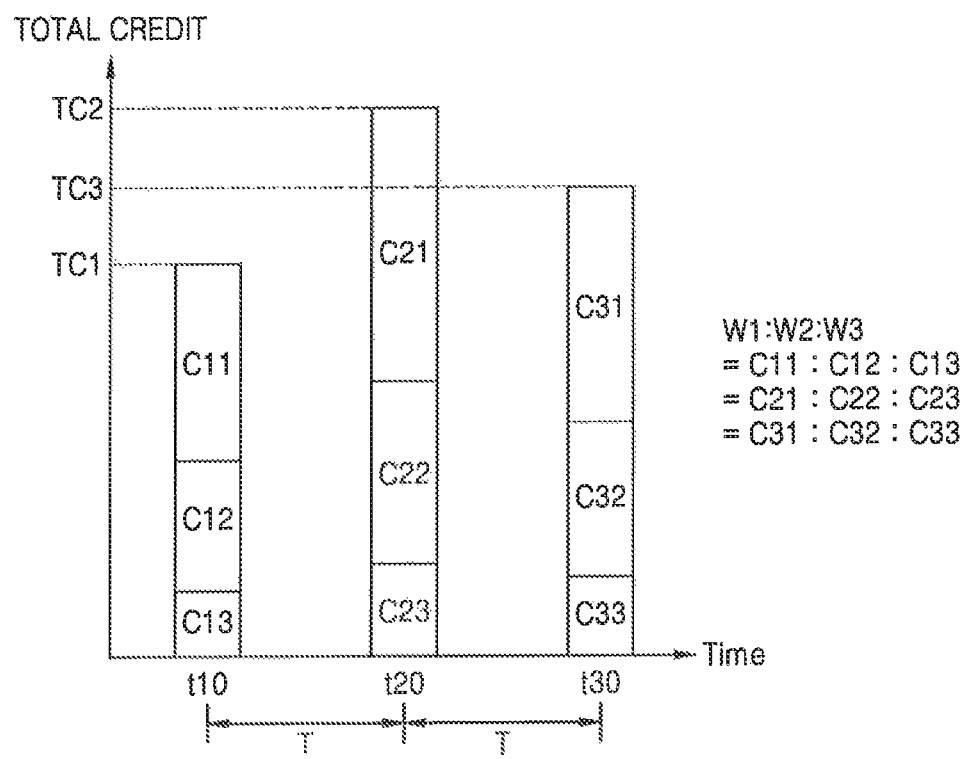
FIG. 4 is a diagram for explaining an operation of allocating credits based on weights of process groups, according to an exemplary embodiment of the inventive concept.

FIG. 4 is a diagram for explaining an operation of allocating credits based on weights of process groups according to an exemplary embodiment of the inventive concept. As described with reference to operation S30 of FIG. 1 and the credit manager 214 of FIG. 3, credits may be allocated to process groups based on weights of the process groups.

According to an exemplary embodiment of the inventive concept, the total credit may be periodically set. For example, as shown in FIG. 4, the total credit may be set as total credits TC1, TC2, and TC3 at sequentially spaced points of time t10, t20, and t30, respectively, with a period T. The total credit may be determined based on an I/O throughput of a resource in a previous period T and may increase or decrease for a current period T, as shown in FIG. 4.

The credits allocated to the process groups may be allocated (or determined) in proportion to the weights of the process groups. In other words, as shown in FIG. 4, credits C11, C12, and C13 allocated at t10, credits C21, C22, and C23 allocated at t20, and credits C31, C32, and C33 allocated at t30 may satisfy an equation below.

$$W1:W2:W3=C11:C12:C13=C21:C22:C23=C31:C32:C33$$

For example, when the total credit TC1 set at t10 is 100 and the first through third weights W1 through W3 are 1000, 700, and 300, respectively, first through third credits C11, C12, and C13 at t10 may be 50, 35, and 15, respectively.

Figure 5:
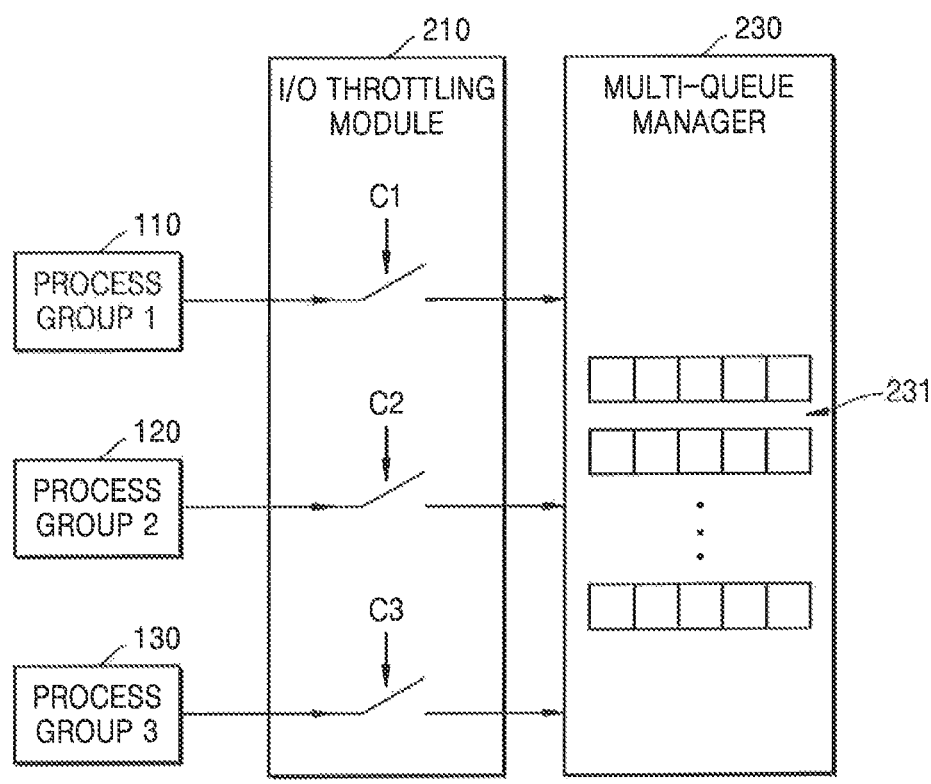
FIG. 5 is a diagram for explaining an operation of selectively dispatching input/output requests of process groups based on credits, according to an exemplary embodiment of the inventive concept.

FIG. 5 is a diagram for explaining an operation of selectively dispatching I/O requests of process groups based on credits according to an exemplary embodiment of the inventive concept. As described with reference to operation S50 of FIG. 1 and the credit manager 214 of FIG. 3, the I/O requests of the process groups may be selectively dispatched to a lower layer based on allocated credits. Referring to FIG. 5, the I/O requests dispatched by the plurality of process groups 110, 120, and 130 may be transferred to the multi-queue manager 230 through the I/O throttling module 210. The multi-queue manager 230 may include a plurality of queues 231. The I/O requests dispatched by the I/O throttling module 210 may be stored in the plurality of queues 231.

The I/O throttling module 210 may allocate the credits C1, C2, and C3 to the process groups 110, 120, and 130, respectively, and may selectively dispatch the I/O requests of the process groups 110, 120, and 130 to the multi-queue manager 230 based on the credits C1, C2, and C3. For example, the I/O throttling module 210 may selectively dispatch the I/O request dispatched by the first process group 110 to the multi-queue manager 230 by consuming the first credit C1. When the first credit C1 is not exhausted, the I/O throttling module 210 may consume at least a part of the first credit C1 based on the I/O request received from the first process group 110 and may dispatch the I/O request to the multi-queue manager 230. When the first credit C1 is exhausted, the I/O throttling module 210 may delay the I/O request received from the first process group 110 until a next period (e.g., period T of FIG. 4). Accordingly, access to resources by the process groups 110, 120, and 130 may be throttled based on the credits C1, C2, and C3, which are, in turn, determined based on the weights (e.g., the weights W1 to W3 of FIG. 3) of the process groups 110, 120, and 130.

Figure 6:
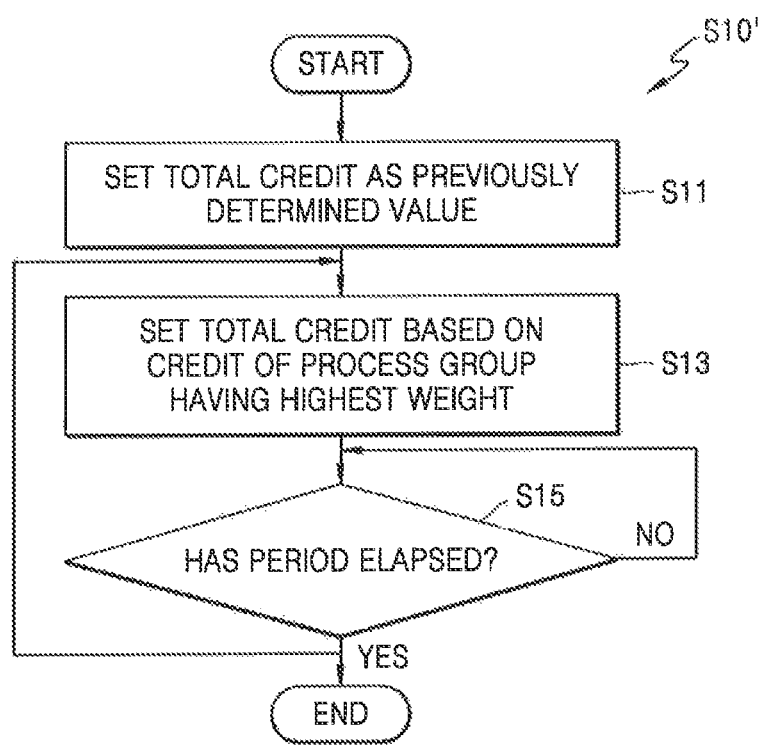
FIG. 6 is a flowchart of an example of an operation of FIG. 1 of setting a total credit corresponding to a multi-queue capable resource, according to an exemplary embodiment of the inventive concept.

FIG. 6 is a flowchart of an example S10' of operation S10 of FIG. 1 according to an exemplary embodiment of the inventive concept. FIG. 6 illustrates an operation of resuming and ending access to a multi-queue capable resource (for example, the multi-queue capable resource 300 of FIG. 2). As described above with reference to FIG. 1, in operation S10, the total credit corresponding to the multi-queue capable resource is set.

Referring to FIG. 6, in operation S11, a total credit is set as a previously determined value. In other words, when the access to the multi-queue capable resource is resumed, the total credit may be set as the previously determined value. For example, the total credit may be set as a certain value irrespective of the type of the resource and may be set as a value determined based on a property of the resource.

In operation S13, the total credit is set based on a credit of a process group having the highest weight. In other words, as shown in FIG. 4, since the weight W1 of the first process group 110 is the highest among the weights W1, W2, and W3, the total credit may be set based on the credit C1 of the first process group 110. For example, as will be described with reference to FIGS. 8A and 8B, when the credit of a process group having the highest weight is exhausted during the previous period, the total credit of the current period may be set to be greater than the total credit of the previous period. When the credit of the process group having the highest weight is not exhausted during the previous period, the total credit of the current period may be set to be less than the total credit of the previous period.

In operation S15, it is determined whether a period has elapsed. When it is determined that the period has elapsed, the total credit may be reset in operation S13. If not, operation S15 is performed again. In other words, the total credit may be reset each period.

Figure 7A:
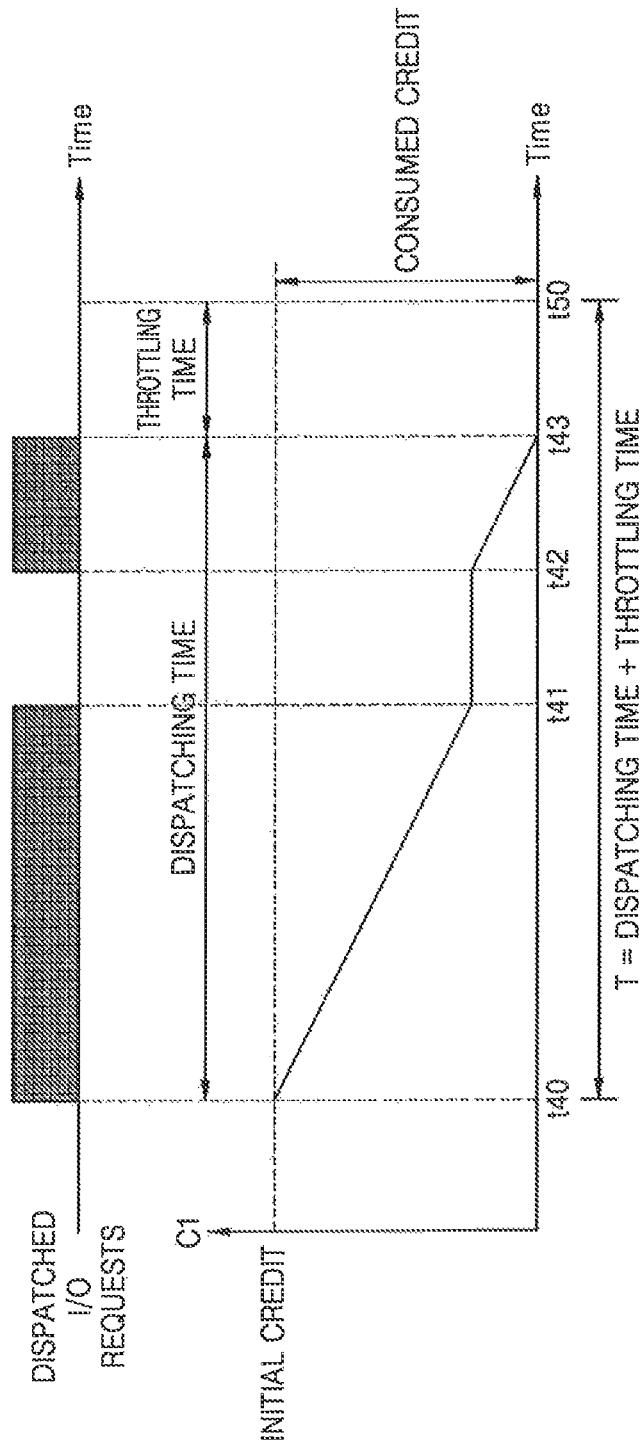
FIGS. 7A and 7B are diagrams of an operation of consuming a credit of a process group during a period, according to an exemplary embodiment of the inventive concept.
Figure 7B:
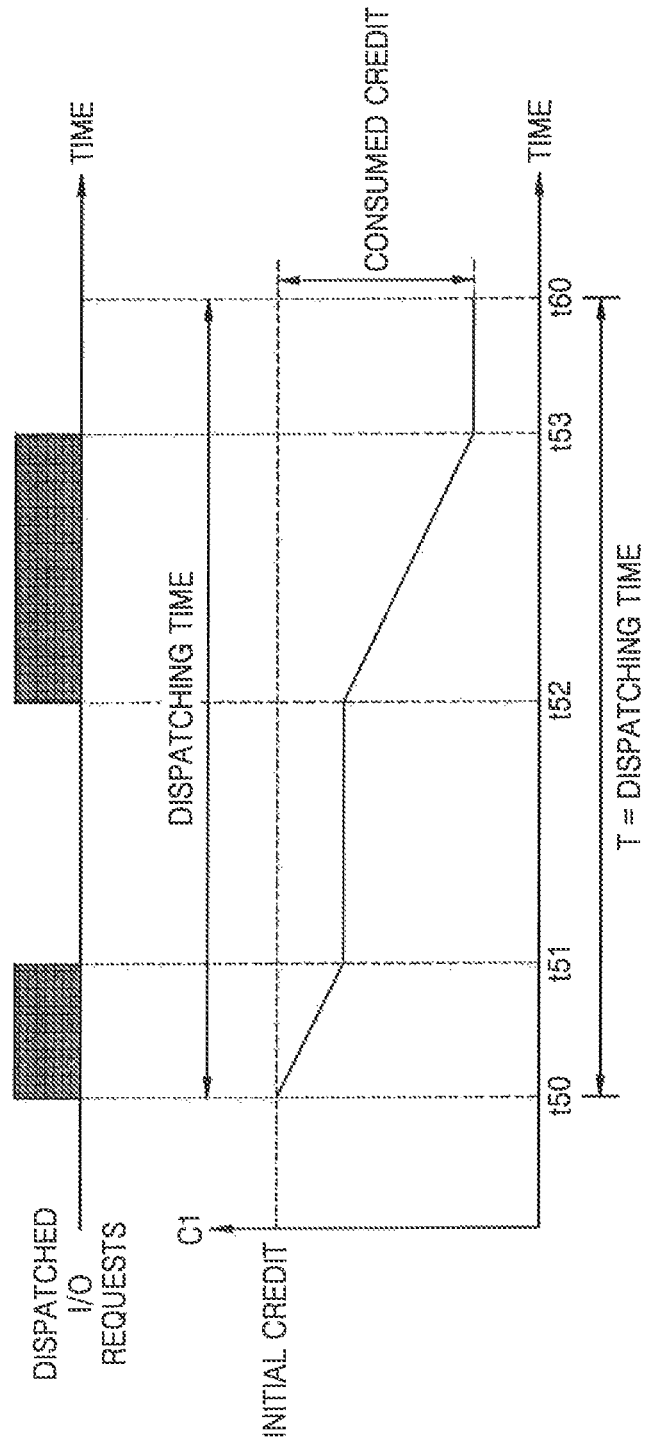

FIGS. 7A and 7B are diagrams of an operation of consuming a credit of a process group during a period according to an exemplary embodiment of the inventive concept. For example, the credit C1 of the first process group 110 may be consumed during the period T. In FIGS. 7A and 7B, the top of the diagrams indicates I/O requests dispatched from the I/O throttling module 210 to the multi-queue manager 230 (as shown in FIG. 5), and the bottom of the diagrams indicates changes in the size of the first credit C1 over time.

Referring to FIG. 7A, the first credit C1 may be set to an initial value at t40. In other words, as described above, the first credit C1 may be set to an initial credit, which is a portion of the total credit based on the weight of the first process group 110.

In a section from t40 to t41, the first credit C1 may be reduced due to I/O requests dispatched by the first process group 110. In a section from t41 to t42, the first credit C1 may be uniformly maintained. In a section from t42 to t43, the first credit C1 may be further reduced due to the I/O requests dispatched by the first process group 110. The first credit C1 may be exhausted at t43. Accordingly, the I/O requests dispatched by the first process group 110 from t43 to t50 may be delayed until a next period.

As shown in FIG. 7A, the section from t40 to t43, before the first credit C1 is exhausted, may be referred to as a dispatching time, and the section from t43 to t50, after the first credit C1 is exhausted, may be referred to as a throttling time. The period T may be the sum of the dispatching time and the throttling time. As shown in FIG. 7A, when the first credit C1 is exhausted before the period T has elapsed, the amount of consumed credit may be equal to the amount of the initial credit.

Referring to FIG. 7B, the first credit C1 may be set as the initial credit at t50. In a section from t50 to t51, the first credit C1 may be reduced due to the I/O requests dispatched by the first process group 110. In a section from t51 to t52, the first credit C1 may be uniformly maintained. In a section from t52 to t53, the first credit C1 may be further reduced due to the I/O requests dispatched by the first process group 110. In a section from t53 to t60, the first credit C1 may be uniformly maintained.

As shown in FIG. 7B, the first credit C1 is not exhausted before the period T elapses. In this case, the dispatching time may be equal to the period T, and the throttling time may be zero. The amount of consumed credit may be smaller than the amount of initial credit.

FIGS. 8A and 8B are diagrams of examples S13a and S13b of operation S13 of FIG. 6 according to exemplary embodiments of the inventive concept. FIGS. 8A and 8B illustrate pseudocode for an operation of calculating a total credit. As described with reference to FIG. 6, in operation S13, the total credit is set based on the credit of a process group having the highest weight. In FIGS. 8A and 8B, a variable 'MaxWeightPG' may correspond to the process group having the maximum weight, and variables 'ConsumedCredit', 'DispatchingTime', 'ThrottlingTime', 'NextCredit', and 'InitialCredit' may be properties of 'MaxWeightPG'. In FIGS. 8A and 8B, a function 'Next_TotalCredit' may be called at the time when a period has elapsed. In the description below, it is assumed that 'MaxWeightPG' corresponds to the first process group 110 having the first weight W1 of FIG. 4 and allocated with the first credit C1.

Referring to FIG. 8A, the total credit of the next period may be set differently depending on whether the first credit C1 is exhausted during the current period, according to an exemplary embodiment of the inventive concept. For example, the first credit C1 may be consumed during a period. When the throttling time 'ThrottlingTime' is greater than 0 (e.g., as described with reference to FIG. 7A), a service speed (e.g., 'ServiceRate') may be calculated at line 3 of FIG. 8A. The service speed may be an average speed at which the first process group 110 consumes the first credit C1 during the dispatching time 'DispatchingTime'. At line 4 of FIG. 8A, the first credit C1 (e.g., 'NextCredit') that is to be allocated to the first process group 110 in the next period is set to the sum of the first credit C1 (e.g., 'InitialCredit') previously allocated to the first process group 110 and the amount of credit that could have been consumed during the throttling time (e.g., the product of the service speed and the throttling time, 'ServiceRate*ThrottlingTime'). In other words, 'NextCredit' may be greater than 'InitialCredit'.

When the first credit C1 is not exhausted during the current period (e.g., 'ThrottlingTime' is zero, as described with reference to FIG. 7B), at line 6 of FIG. 8A, the first credit C1 (e.g., 'NextCredit') that is to be allocated to the first process group 110 in the next period may be set to the first credit C1 (e.g., 'ConsumedCredit') consumed by the first process group 110 during the current period. In other words, 'NextCredit' may be smaller than 'InitialCredit'.

The total credit of the next period (e.g., 'NextTotalCredit') may be set based on the first credit C1 (e.g., 'NextCredit') that is to be allocated to the first process group 110 in the next period. In other words, at line 8 of FIG. 8A, the total credit of the next period (e.g., 'NextTotalCredit'), with respect to the total credit of the current period (e.g., 'TotalCredit'), may increase or decrease as much as the rate of increase or decrease of the first credit C1 (e.g., 'NextCredit'/'InitialCredit').

Referring to FIG. 8B, the total credit of the next period may be set according to a speed at which the first credit C1 is consumed during the current period according to an exemplary embodiment of the inventive concept. In other words, the service speed (e.g., 'ServiceRate'), which is an average speed at which the first process group 110 consumes the first credit C1 during a dispatching time (e.g., 'ConsumedCredit'/'DispatchingTime'), may be calculated. The first credit C1 (e.g., 'NextCredit') that is to be allocated to the first process group 110 in the next period may be set as the amount of credit that would be consumed at the service speed over the entire period (e.g., 'ServiceRate'*('DispatchingTime'+'ThrottlingTime')). Accordingly, when the first credit C1 is exhausted during the current period, the first credit C1 (e.g., 'NextCredit') that is to be allocated to the first process group 110 in the next period may be greater than the first credit C1 (e.g., 'InitialCredit') previously allocated to the first process group 110, and when the first credit C1 is not exhausted during the current period, 'NextCredit' may be smaller than 'InitialCredit'. At line 4 of FIG. 8B, similar to line 8 of FIG. 8A, the total credit of the next period (e.g., 'NextTotalCredit'), with respect to the total credit of the current period (e.g., 'TotalCredit'), may increase or decrease as much as the rate of increase or decrease of the first credit C1 (e.g., 'NextCredit'/'InitialCredit').

Figure 9:
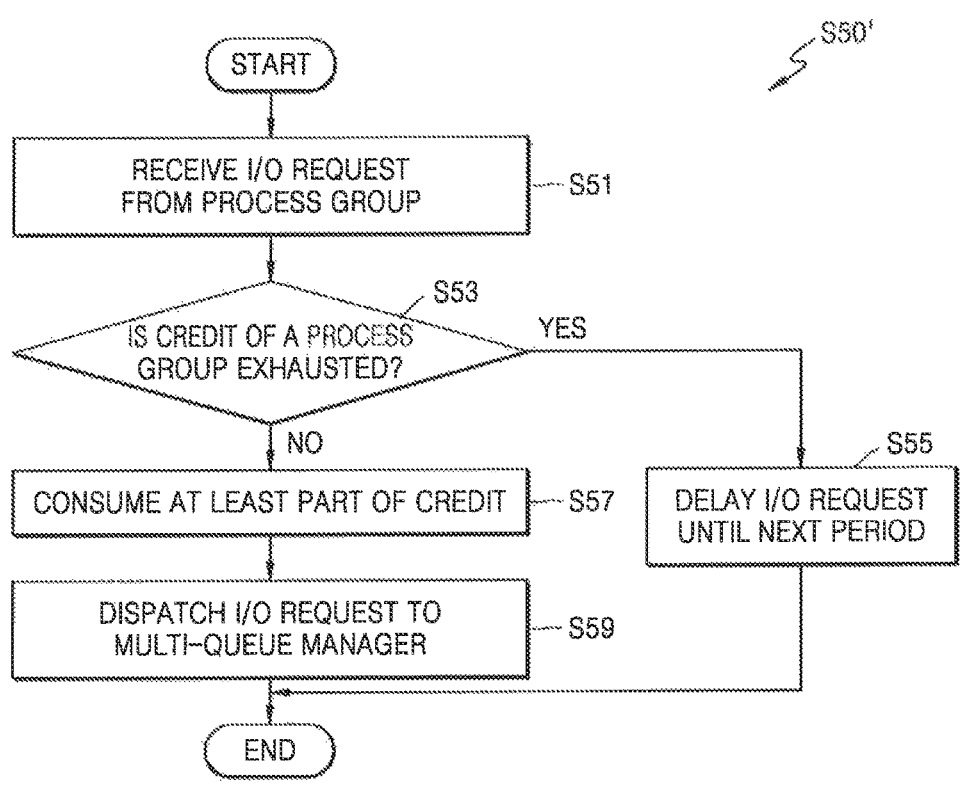
FIG. 9 is a flowchart of an example of an operation of FIG. 1 of selectively dispatching an I/O request of a process group, according to an exemplary embodiment of the inventive concept.

FIG. 9 is a flowchart of an example S50' of operation S50 of FIG. 1 according to an exemplary embodiment of the inventive concept. As described with reference to FIG. 1, in operation S50, an I/O request of a process group is selectively dispatched by consuming a credit. As described with reference to FIG. 5, the operation S50' may be performed by the I/O throttling module 210 and may be performed on a plurality of process groups in parallel with one another. The flowchart of FIG. 9 will be described below with reference to FIG. 5.

Referring to FIG. 9, in operation S51, an I/O request is received from a process group. For example, the I/O throttling module 210 of FIG. 5 may receive I/O requests from the process groups 110, 120, and 130.

In operation S53, it is determined whether a credit of the process group is exhausted. When it is determined that the credit of the process group is exhausted, in operation S55, the I/O request is delayed until a next period. In other words, the I/O request of the process group corresponding to the exhausted credit may not be dispatched to the multi-queue manager 230 of FIG. 5 until the current period elapses.

When it is determined that the credit of the process group is not exhausted, in operation S57, at least a part of the credit is consumed. For example, the I/O request of the first process group 110 of FIG. 5 may be received, and when the first credit C1 is not exhausted, at least a part of the first credit C1 may be consumed, e.g., the first credit C1 may be reduced. Next, in operation S59, the I/O request is dispatched to the multi-queue manager. For example, the I/O request of the first process group 110 of FIG. 5 may be dispatched to the multi-queue manager 230.

Figure 10:
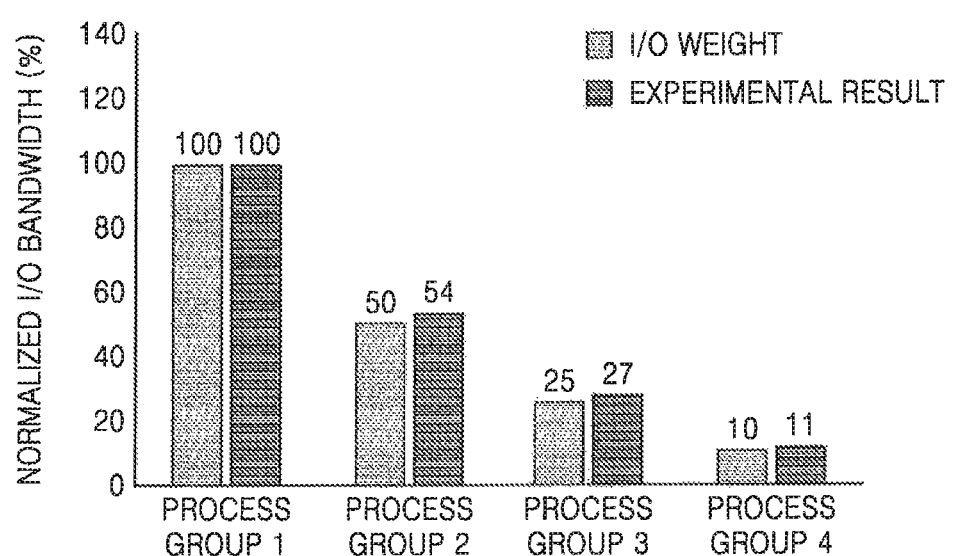
FIG. 10 is a graph of an experimental result of an input/output throttling method of process groups, according to an exemplary embodiment of the inventive concept.

FIG. 10 is a graph of an experimental result of an I/O throttling method of process groups according to an exemplary embodiment of the inventive concept. The graph of FIG. 10 shows an average value of an I/O bandwidth with respect to a multi-queue capable resource for each of four process groups when the four process groups are executed for a certain period of time.

As shown in FIG. 10, the four process groups may have weights of 100, 50, 25, and 10. When the four process groups are executed for a certain period of time by using the I/O throttling method of the process groups according to exemplary embodiments of the inventive concept described above, the four process groups may have I/O bandwidths of 100, 54, 27, and 11. In other words, the experimental result shows that the four process groups have I/O bandwidths that are similar to or substantially the same as the weights of the four process groups.

Figure 11:
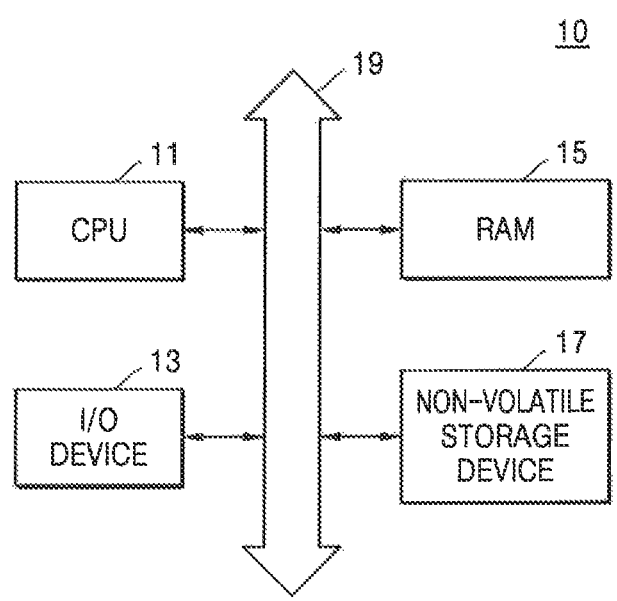
FIG. 11 is a diagram of a computing system according to an exemplary embodiment of the inventive concept.

FIG. 11 is a diagram of a computing system 10 according to an exemplary embodiment of the inventive concept. As shown in FIG. 11, the computing system 10 may include a central processing unit (CPU) 11, an I/O device 13, a RAM 15, and a nonvolatile storage device 17. The CPU 11, the I/O device 13, the RAM 15, and the nonvolatile storage device 17 may communicate with one another via a bus 19. The computing system 10 may further include ports for communicating with a video card, a sound card, a memory card, a universal serial bus (USB) device, etc. or other electronic devices. The computing system 10 may be a stationary electronic device such as a personal computer, a server, etc. or may be a portable electronic device such as a laptop computer, a tablet computer, a mobile phone, a personal digital assistant (PDA), or a camera.

The CPU 11 may be configured to execute instructions to perform at least one of the methods described above, according to exemplary embodiments of the inventive concept. For example, the CPU 11 may execute the process groups and OS and may perform the I/O throttling method of process groups. In other words, operations included in flowcharts described above may be partially or wholly performed by the CPU 11. The process groups executed by the CPU 11 may access other elements connected to and in communication with the CPU 11 via the bus 19, e.g., a multi-queue capable resource such as the I/O device 13 and the nonvolatile storage device 17, by using the I/O throttling method of process groups.

According to an exemplary embodiment of the inventive concept, the CPU 11 may execute an arbitrary instruction set (for example, Intel Architecture-32 (IA-32), 64 bit extension IA-32, x86-64, PowerPC, Sparc, MIPS, ARM, IA-64, etc.). The CPU 11 may include a plurality of cores that independently execute instructions.

The I/O device 13 may receive an input signal from outside the computing system 10 or may provide an output signal to the outside of the computing system 10. For example, the I/O device 13 may include an input device such as a keyboard, a touch screen, a pointing device, etc. and an output device such as a display device, a printer, etc. The I/O device 13 may include a communication device that transmits or receives data to or from the outside of the computing system 10 over a communication network. The I/O device 13 may be a multi-queue capable resource as described above, and may receive requests from process groups executed by the CPU 11 by using the I/O throttling method of process groups according to exemplary embodiments of the inventive concept.

The RAM 15 may function as a data memory and may temporarily store data that moves between elements of the computing system 10. For example, the RAM 15 may be a volatile memory device, e.g., a dynamic random access memory (DRAM), a static RAM (SRAM), a mobile DRAM, a double data rate synchronous DRAM (DDR SDRAM), a low-power DDR (LPDDR) SDRAM, a graphic DDR (GDDR), a Rambus DRAM (RDRAM), etc.

The nonvolatile storage device 17 may store a plurality of instructions executed by the CPU 11 for the I/O throttling method of process groups according to exemplary embodiments of the inventive concept. For example, the nonvolatile storage device 17 may be a nonvolatile memory system such as a hard disk drive (HDD), a solid disk drive (SSD), a memory card, etc. The nonvolatile storage device 17 may include an electrically erasable programmable read-only memory (EEPROM), a flash memory, a phase-change RAM (PRAM), a resistive RAM (RRAM), a nano floating gate memory (NFGM), a polymer RAM (PoRAM), a magnetic RAM (MRAM), a ferroelectric RAM (FRAM), etc. The nonvolatile storage device 17 may be a multi-queue capable resource as described above, and may receive the requests from the process groups executed by the CPU 11 by using the I/O throttling method of process groups according to exemplary embodiments of the inventive concept.

Figure 12:
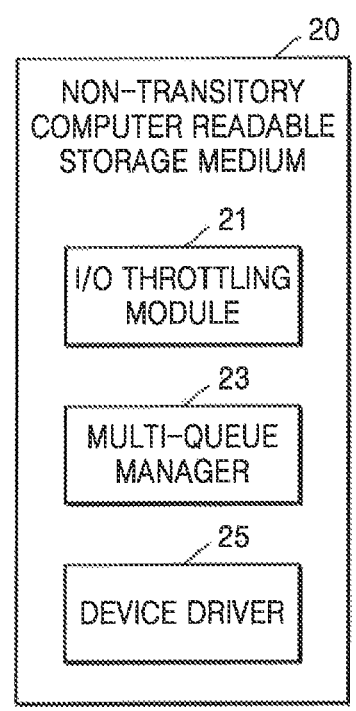
FIG. 12 is a block diagram of a non-transitory computer-readable recording medium according to an exemplary embodiment of the inventive concept.

FIG. 12 is a block diagram of a non-transitory computer-readable recording medium 20 according to an exemplary embodiment of the inventive concept. Referring to FIG. 12, the non-transitory computer-readable recording medium 20 may include an I/O throttling module 21, a multi-queue manager 23, and a device driver 25. Although the I/O throttling module 21, the multi-queue manager 23, and the device driver 25 are included in the single non-transitory computer-readable recording medium 20 in FIG. 12, the I/O throttling module 21, the multi-queue manager 23, and the device driver 25 may be included in different and separate non-transitory computer-readable recording media.

The non-transitory computer-readable recording medium 20 may include an arbitrary computer-readable storage medium while being used to provide instructions and/or data to a computer. For example, the non-transitory computer-readable recording medium 20 may include a magnetic or optical medium such as a disk, a tape, CD-ROM, DVD-ROM, CD-RW, DVD-RW, etc., a volatile or nonvolatile memory such as RAM, ROM, a flash memory, etc., a nonvolatile memory accessed via USB interface, microelectromechanical systems (MEMS), etc. The non-transitory computer-readable recording medium 20 may be inserted into the computer, may be integrated into the computer, or may be coupled to the computer via a communication medium such as a network and/or a wireless link.

The I/O throttling module 21 may include a plurality of instructions to perform the I/O throttling method of process groups according to exemplary embodiments of the inventive concept described above. For example, the I/O throttling module 21 may include a plurality of instructions to perform an operation of selectively dispatching I/O requests of process groups with respect to a multi-queue capable resource by setting a total credit, allocating credits to the process groups based on the total credit and weights of the process groups, and consuming the allocated credits.

The multi-queue manager 23 may include a plurality of instructions to perform an operation of managing a plurality of queues according to exemplary embodiments of the inventive concept described above. For example, the device driver 25 may include a plurality of instructions to perform an operation of transferring an I/O request to the multi-queue capable resource through an interface protocol supported by the multi-queue capable resource.

While the inventive concept has been shown and described with reference to exemplary embodiments thereof, it will be understood by those of ordinary skill in the art that various changes in form and details may be made thereto without departing from the spirit and scope of the inventive concept as defined by the following claims.

What is claimed is:

1. An input/output (I/O) throttling method of a process group, the I/O throttling method comprising:
   setting a total credit corresponding to a multi-queue capable resource, for the process group;
   receiving a weight of the process group;
   allocating an individual credit to the process group based on the total credit and the weight; and
   selectively dispatching an I/O request of the process group to a multi-queue manager by consuming at least a part of the individual credit,
   wherein the process group is one of a plurality of process groups, each assigned a weight,
   a highest weight process group has the highest weight among the plurality of process groups,
   the highest weight process group is allocated a highest weight individual credit, and
   the total credit is set by calculating a current total credit of a current period based on an amount of the highest weight individual credit consumed during a previous period by the highest weight process group.

2. The I/O throttling method of claim 1, wherein the I/O request of the process group is dispatched in the current period, and the total credit is set and the individual credit is allocated in the previous period.

3. The I/O throttling method of claim 2, wherein when the highest weight process group exhausts the highest weight individual credit during the previous period, the current total credit of the current period is greater than a previous total credit of the previous period, and when the highest weight process group does not exhaust the highest weight individual credit during the previous period, the current total credit of the current period is smaller than the previous total credit of the previous period.

4. The I/O throttling method of claim 1, wherein a ratio of a sum of the weights of the plurality of process groups to the weight of the process group is equal to a ratio of the total credit to the individual credit of the process group.

5. The I/O throttling method of claim 1, wherein selectively dispatching I/O requests of each of the plurality of process groups to the multi-queue manager is performed in parallel with one another.

6. The I/O throttling method of claim 1, wherein selectively dispatching the I/O request of the process group comprises:
   receiving an I/O request from the process group;
   determining whether the individual credit allocated to the process group is exhausted;
   when it is determined that the individual credit allocated to the process group is exhausted, delaying the I/O request of the process group; and
   when it is determined that the individual credit allocated to the process group is not exhausted, consuming at least a part of the individual credit in response to the I/O request from the process group and dispatching the I/O request of the process group to the multi-queue manager.

7. The I/O throttling method of claim 1, wherein the multi-queue capable resource is a storage device, and wherein the multi-queue manager dispatches the I/O request of the process group to a storage device driver.

8. The I/O throttling method of claim 1, wherein the process group is a container comprising one or more applications in a user space, wherein the multi-queue manager is included in a block layer of a kernel space, wherein the I/O throttling method of the process group is performed by an I/O throttling module included in a first layer of the kernel space, and wherein the first layer of the kernel space is between the user space and the block layer in the kernel space.

9. An I/O throttling method of a plurality of process groups, the I/O throttling method comprising:
   setting a total credit corresponding to a multi-queue capable resource, for the plurality of process groups;
   allocating individual credits to the plurality of process groups based on the total credit and weights of the plurality of process groups;
   selectively dispatching I/O requests of each of the plurality of process groups to a multi-queue manager by consuming at least parts of at least one of the individual credits;
   determining that a throttling time of a first period is greater than zero;
   determining an average service speed based on a consumed amount of a first individual credit of a first process group and a dispatching time of the first period; and
   determining a second individual credit of the first process group for a second period based on the first individual credit, the average service speed, and the throttling time when the throttling time is greater than zero.

10. The I/O throttling method of claim 9, wherein the I/O requests are dispatched in a current period, and the total credit is set and the individual credits are allocated in a previous period.

11. The I/O throttling method of claim 10, wherein a highest weight process group has the highest weight among the plurality of process groups, the highest weight process group is allocated a highest weight individual credit, and the total credit is set by calculating a current total credit of the current period based on an amount of the highest weight individual credit consumed during the previous period by the highest weight process group.

12. The I/O throttling method of claim 9, wherein allocating the individual credits comprises determining the individual credits of the plurality of process groups such that a distribution of weights of the plurality of process groups corresponds to a distribution of the individual credits of the plurality of process groups.

13. The I/O throttling method of claim 9, wherein selectively dispatching the I/O requests of each of the plurality of process groups is performed in parallel with one another.

14. The I/O throttling method of claim 9, wherein each of the plurality of process groups is a container comprising one or more applications in a user space, wherein the multi-queue manager is included in a block layer of a kernel space, wherein the I/O throttling method of the process groups is performed by an I/O throttling module included in a first layer of the kernel space, and wherein the first layer of the kernel space is between the user space and the block layer in the kernel space.

15. An I/O throttling method of a plurality of process groups, the I/O throttling method comprising:
   determining a first total credit, corresponding to a multi-queue capable resource, for the plurality of process groups, wherein each of the plurality of process groups is assigned a weight and a first process group among the plurality of process groups has the highest weight and is allocated a first individual credit that is a portion of the first total credit;
   dispatching I/O requests from the first process group and consuming at least a part of the first individual credit when the first individual credit is not exhausted during a dispatching time, and delaying I/O requests from the first process group when the first individual credit is exhausted during a throttling time, wherein the dispatching time and the throttling time form a first period;
   determining an average service speed based on a consumed amount of the first individual credit and the dispatching time;
   determining a second individual credit of the first process group for a second period based on the average service speed, the dispatching time, and the throttling time; and
   determining a second total credit corresponding to the multi-queue capable resource, for the plurality of process groups, for the second period based on the first total credit for the first period, the second individual credit for the second period, and the first individual credit for the first period.

16. The I/O throttling method of claim 15, wherein a ratio of the first total credit to the first individual credit of the first process group is equal to a ratio of a total weight among the plurality of the process groups to the weight of the first process group.

17. The I/O throttling method of claim 15, the method further comprising:
   determining that the throttling time of the first period is greater than zero;
   and
   determining the second individual credit of the first process group for the second period based on the first individual credit, the average service speed, and the throttling time when the throttling time is greater than zero.

18. The I/O throttling method of claim 15, the method further comprising:
   determining that the throttling time of the first period is equal to zero; and
   setting a second individual credit of the first process group for the second period as the consumed amount of the first individual credit when the throttling time is equal to zero.

* * * * *